United States Patent [19]

Flemmer et al.

[11] 4,127,683
[45] Nov. 28, 1978

[54] METHOD OF STACKING GLASS SHEETS

[75] Inventors: Dieter Flemmer; Friedrich Halberschmidt, both of Herzogenrath; Karl-Josef Feiten, Wuerseln, all of Germany

[73] Assignee: Saint-Gobain Industries, Neuilly-sur-Seine, France

[21] Appl. No.: 713,809

[22] Filed: Aug. 12, 1976

[30] Foreign Application Priority Data

Aug. 20, 1975 [DE] Fed. Rep. of Germany ....... 2537034

[51] Int. Cl.² .............................................. B05D 5/00
[52] U.S. Cl. ..................................... 427/287; 29/427; 118/236; 206/454
[58] Field of Search ............................... 427/154–156, 427/300, 287, 416, 506, 289, 443, 269; 156/152, 344; 65/23, 24; 214/6 M; 29/458, 424, 427; 118/236; 428/440, 484; 350/178; 53/157; 206/205, 449, 454, 448

[56] References Cited

U.S. PATENT DOCUMENTS

| 2,596,863 | 5/1952 | Moulton et al. | 428/440 X |
| 3,843,574 | 10/1974 | Apikos | 427/155 X |

FOREIGN PATENT DOCUMENTS 872,723 7/1961 United Kingdom ..................... 428/440

Primary Examiner—Morris Kaplan
Attorney, Agent, or Firm—Pennie & Edmonds

[57] ABSTRACT

An inert chemical material comprising primarily paraffin or wax is deposited on a surface of a plurality of sheets of glass and the sheets stacked with the deposited paraffin or wax forming intercalations therebetween. The paraffin or wax material may be deposited in granular or molten form. Advantageously molten material is deposited in spaced drops to form spaced raised spots over the surface of each sheet. Preferred dimensions, melting temperatures, compositions, etc. are given. A first group of spots may be initially deposited of paraffin or wax material having a lower solidification temperature, and thereafter drops having a higher solidification temperature deposited thereon. Apparatus for performing the methods includes one or more heated reservoirs positioned over a conveyor and having a group of nozzles spaced laterally of a sheet of glass on the conveyor and actuated to deposit molten paraffin or wax material drop by drop on the surface of the glass sheet.

9 Claims, 5 Drawing Figures

METHOD OF STACKING GLASS SHEETS

The instant application generally relates to subject matter disclosed in copending United States application Ser. No. 775,546, filed Mar. 8, 1977, directed to Glass Panes With Particles Adhered Thereto.

The present invention relates to a method of stacking or packing flat or curved sheets of glass by providing between the sheets a separating means made of inert chemical material.

It is general practice to place a separating means between sheets of glass when the latter are being stacked. The separating means is firstly intended to prevent direct contact between the glass surfaces and thus protect them from mechanical damage. Secondly, another important advantage of the separating means is that it reduces the force of adhesion when a sheet of glass is removed from the stack, thereby facilitating removal. Finally, the separating means can also contain substances which are intended to protect the surface of the glass from chemical attack, for example, from moisture.

Intermediate layers of paper are frequently used as a separating means. A number of other materials which can be used as separating means are also known, for example, sawdust, infusorial earth, organic polymers such as polyethylenes, polymethylmethacrylates, polyesters and polystyrols. These products are employed, according to the application, in the form of floury powder or grains having a grain size of some tenths of a millimeter in diameter.

The separating means is generally dusted, laminated or brushed onto the sheet of glass or applied mechanically to the surface of the glass by other means.

The known materials used as separating means have particular disadvantages. For example, paper is costly and presents problems in regard to handling and automation. Granular materials and pulverulent materials are a source of pollution to the environment and only fulfill their function when they are in very fine form as otherwise they do not adhere to the surface of the glass. However, in the case of very fine grains, the force of adhesion between the sheets of glass is not sufficiently reduced and, as a result, these substances do not adequately fulfill their function in terms of enabling each sheet to be readily separated from the pile.

In certain cases, it is very important to be able to remove each of the sheets of glass from a stack as rapidly as possible. This is particularly true in the case of the series of handling operations which the sheets of glass must undergo in a factory when they are being transported in stack form between each work station and when they are stacked or removed from the stack automatically, as the rate at which the sheets can be removed from the stack is determined by the adhesive force between the sheets.

The problem consists in finding separating materials which are completely neutral both chemically and physically, which do not harm the environment and which are economical. The process for applying these materials should also lend itself to automation. These materials should also possess the property of reducing the force of adhesion between the sheets of glass to the extent that a rapid operating rate can be employed for removing each of the sheets of glass.

According to the invention, paraffin or wax is used as the separating means. In contrast to the known polymers of organic materials, paraffins and waxes are monomers which are not especially volatile and which evaporate without decomposition. They are malleable and adhere to the glass.

The use of paraffins or waxes as a separating means offers the following important advantages. Since the material adheres to the surface of the glass there is no risk of it becoming detached from the sheet of glass. A relatively small quantity of the material can be used and there is little risk of polluting the environment. Both paraffin and wax, in that they do not contain any additional elements, will burn without leaving residues. Consequently, the separating means is particularly suited for use when products are made which undergo a thermal treatment in a furnace.

During handling of each sheet of glass, and also during the washing operation, the separating means continues to adhere to the glass such that when the sheets are to be stacked once again it is not necessary to reapply the separating material.

The method of applying the separating material is inexpensive to implement and to automate.

The paraffin or wax can be applied to the sheet of glass, for example, in granular form. However, it is especially advantageous to apply the material to the glass in liquid form, i.e. in molten form. In this form, drops of appropriate size can be applied to the most suitable parts of the sheet of glass and adhesion of these small particles to the surface of the glass is especially good.

It has been found that in numerous cases it is sufficient to apply only four drops of paraffin or wax, to form what will be referred to hereinafter as "spots," to each square meter of glass surface. As a rule, ten spots per square meter of glass has been found to be completely adequate. The number of spots per square meter can be increased as desired, according to the particular application. However, it has been found that even in extreme cases the distance from one spot to another need not be less than 10 cm so that it is not necessary to place more than 100 spots per square meter. The amount of material constituting a spot can be so determined as to provide a spot having a diameter of 2–10 mm and a thickness of 0.2 to 2 mm. Spots having a diameter of 4 mm. and a thickness of approximately 0.7–0.8 mm. have proved advantageous. With spots having these dimensions, it is possible for example to produce 40,000 spots from a kilo of paraffin and with these no less than 4,000 square meters of glass can be covered.

Paraffins having a high melting point in excess of 50° C. are particularly suitable according to the invention. The melting point should be sufficiently high so that the spots generally retain their shape and do not soften or melt under the normal conditions to which the stack of glass is exposed.

In certain cases it has proven advantageous to use, in molten form, paraffins or waxes which have a high melting point and which have an increased power of contraction upon cooling. During preparation of these materials, it was found that the increased contractive capacity results in that the small spots of wax are partially detached from the glass upon cooling and accordingly the adhesion of these small spots to the surface of the glass is reduced. On the one hand, the degree of adhesion is still sufficient to firmly attach the spots to the surface of the glass and yet, on the other hand, the mechanical separation of spots is substantially facilitated. The special features of these waxes having a high melting point are particularly apparent when the solidification point is in excess of 85° C.

In the case of other applications, it may be advantageous if the spots simultaneously possess good adhesive properties and a marked mechanical resistance to deformation. This is the case, for example, when the glass stacks are subjected to extreme climatic conditions and mechanical stresses.

Wax or paraffin spots having good adhesive properties and marked mechanical resistance to deformation can be produced in different ways.

According to a first embodiment, the spots can be produced, for example, by firstly applying a drop of molten wax or paraffin having a solidification point of below 60° and then applying to the latter a drop of molten wax or paraffin having a high melting point in excess of 90° C.

According to another embodiment of the invention and according to the above-defined aim, modified waxes and paraffins having a high melting point are produced by the adding of a polymer and/or a resin.

The desired object can also be obtained by means of mixtures of different saturated aliphatic hydrocarbons having higher or lower solidification points, the solidification point of the mixture being above 100° C. and the penetration index of the mixture measured by determining needle penetration according to the standard DIN 51 579 being lower than 5 at 20° C. and lower than 40 at 60° C.

In general, it can be stated that paraffins or waxes of this type, i.e., mixtures consisting essentially of saturated hydrocarbons, are capable of fulfilling the above requirements, that is, of having a penetration index of below 5 at 20° C. and of below 40 at 60° C. measured according to the DIN 51 579 standard.

The invention will be described in reference to the accompanying drawings in which.

Figure 1:
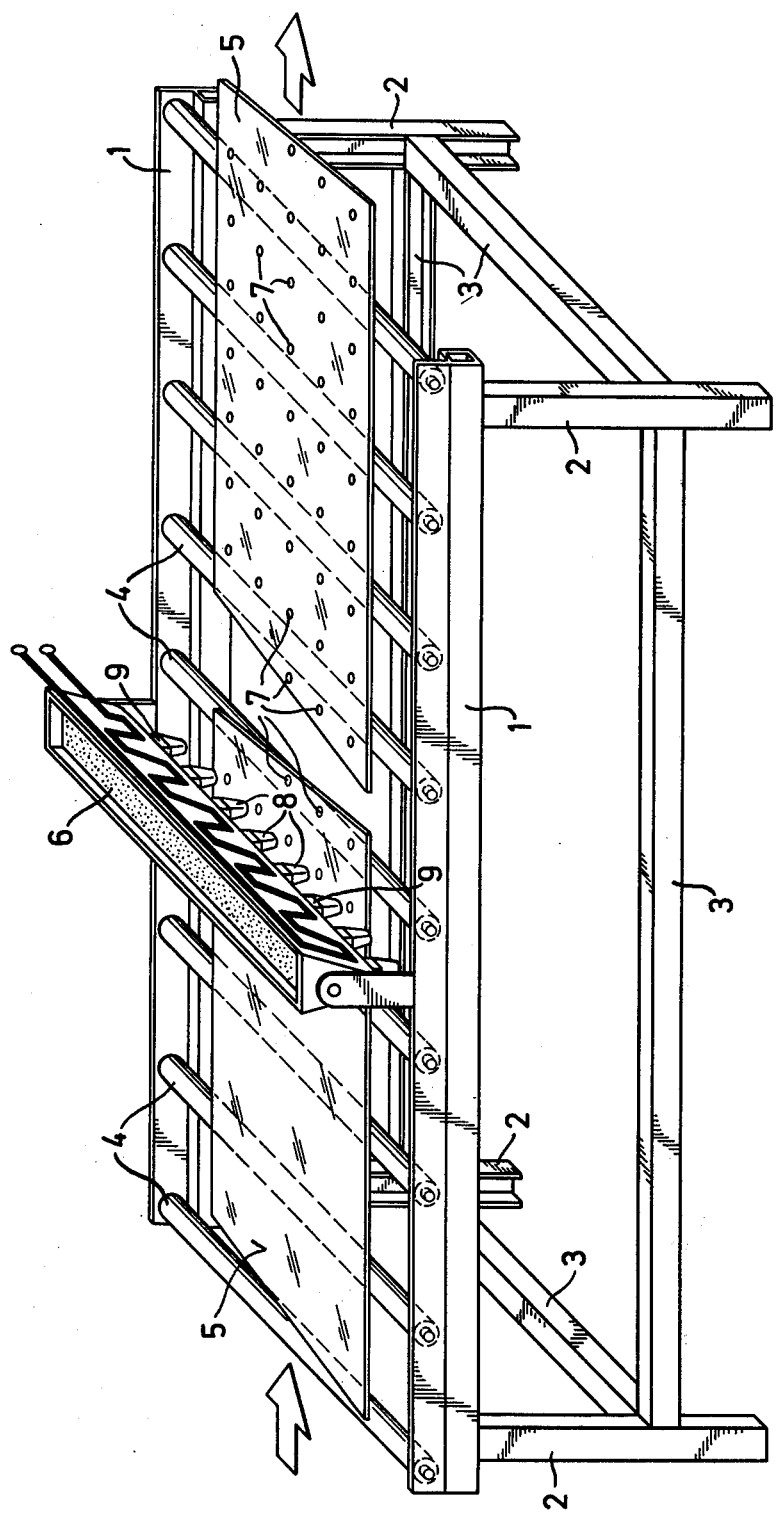
FIG. 1 shows apparatus for depositing the separating material in molten form.
Figure 2:
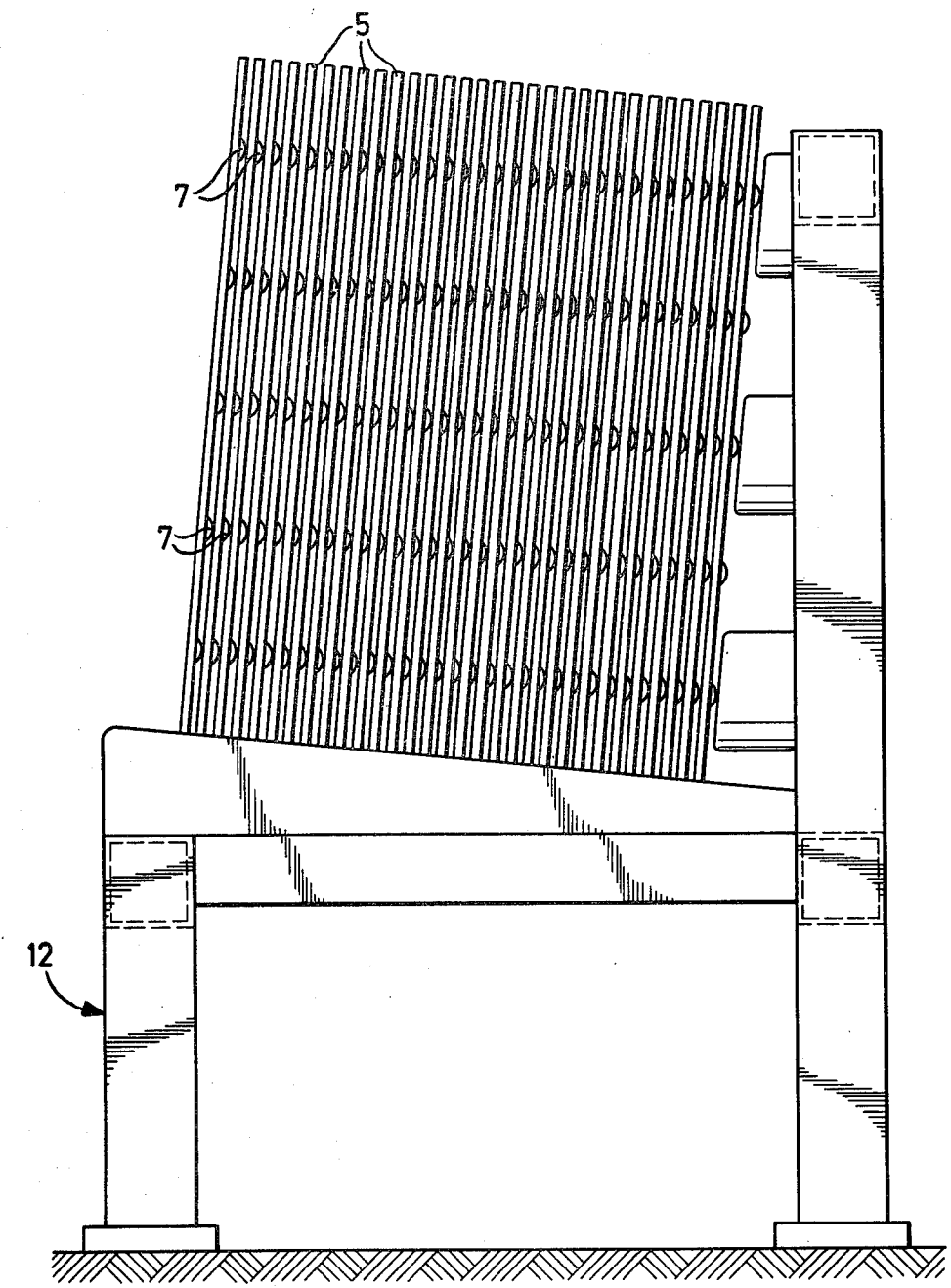
FIG. 2 shows a stack of flat sheets of glsss having raised spots according to the invention.

FIG. 1 shows a horizontal conveyor comprising a frame 1, supports 2, cross-pieces 3 and feed rollers 4, on which the sheets of glass 5 are conveyed from one work station to another in a production unit. As processing of the sheets of glass cannot be carried on continuously for much of the time, the sheets of glass 5 are stacked at the end of the conveyor on a support 12, as shown in FIG. 2. Drops of molten paraffin or wax forming the spots 7 are deposited on the sheet of glass 5 by means of a device mounted on the conveyor, the spots 7 adhering to the glass. The spots 7 are spaced apart on the sheet of glass by approximately 20–30 cm.

The device for applying the drops of paraffin or wax consists essentially of an electrically heated container or reservoir 6, at the base of which is disposed a group of nozzles 8 through which the liquid paraffin or wax is discharged in the form of drops. The flow of liquid paraffin or wax towards the nozzles 8 is interrupted or produced by means or magnetic valves, which are represented diagrammatically. The valves can be automatically operated by control means actuated by the passage of the sheets of glass. The dimensions of the nozzles and the temperature of reservoir 6 are selected so that the drops discharged from the nozzles onto the sheets of glass form raised spots having a diameter of approximately 4 mm and a thickness of approximately 0.75 mm.

For example, a pure paraffin without any additives and having a melting point of approximately 60° C. can be used.

In another embodiment, a wax having a high melting point and a solidification point in excess of 85° C. and an elevated contraction capacity was used. Owing to its increased contractive capacity, the latter is partially detached from the surface of the glass upon cooling. Wax spots having this reduced degree of adhesion to the glass can be removed rapidly at a temperature of approximately 60° C. by acting on them mechanically during the washing operation.

The support 12, which is used to transport the sheets of glass in the production unit, is unloaded at a different point in the production unit where the sheets of glass are removed in succession. In a complete series of tests in which the pulling-off force employed in removing sheets of glass from the stack was determined for sheets measuring 1,000 × 500 mm and using different separating or intercalation means, it was found that when spots of paraffin or wax are used as the intercalation means, the pulling-off force was approximately 10% of that measured when sawdust or paper was used. A reduction in the pulling-off force of about 85% was also measured by comparision with "lucite," which is a granulous polymethacrylate and known separating means. As a result, operating rates can be considerably increased during removal of the sheets of glass.

A thermal treatment is frequently included in the steps for processing sheets of glass. For example, when producing safety glass, the sheets of glass are heated to a temperature in excess of 600° C. In this case, it was found that spots of paraffin or wax were immediately completely burned up during heating of the sheets of glass without producing any harmful combustion products or requiring any additional treatment steps.

Figure 3:
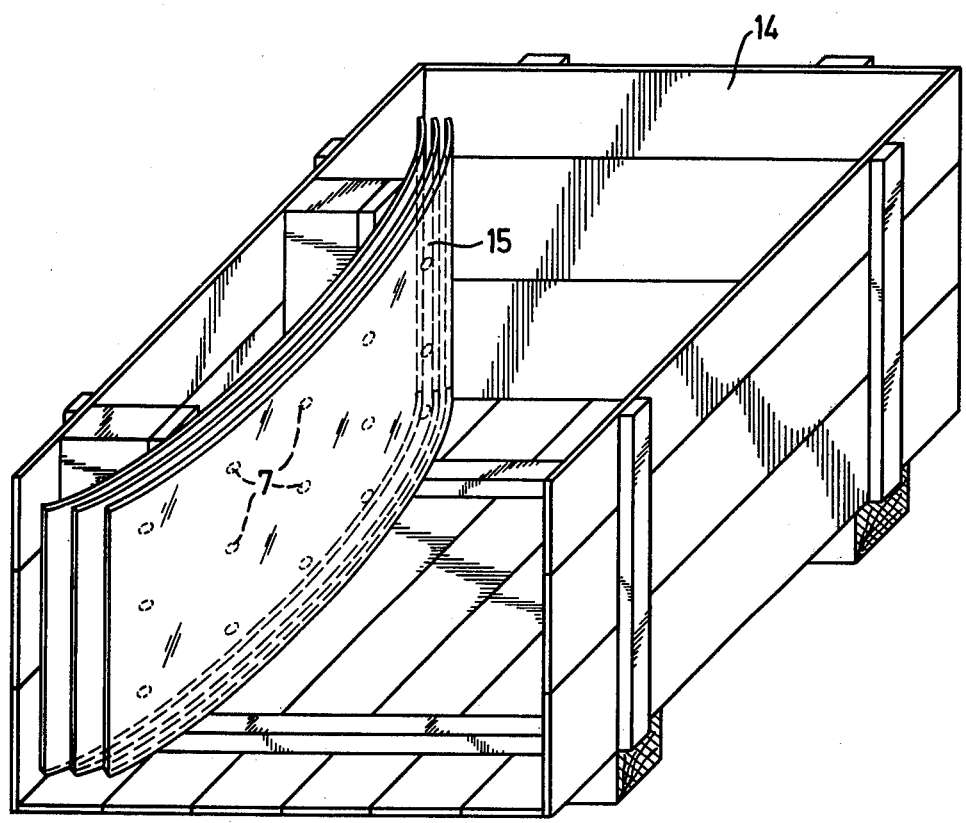
FIG. 3 shows a shipping crate containing sheets of glass having raised spots according to the invention.

FIG. 3 shows the use of the intercalation means in a crate shipped to a customer. The product being shipped consists of curved sheets of glass 15, for example, windshields, which are being shipped in a wooden case. In this case, the invention provides certain advantages such as, inter alia, automation of the process for applying the spots 7, the possibility of automating the process for depositing the sheets of glass in the crate, and in addition, low costs and lack of pollution to the environment.

In the case of sheets of glass for automobiles, the spots of paraffin or wax are preferably placed on the convex face of the sheets of glass so that they are automatically removed during the removal of the wax protective layer which is applied to automobiles before they are shipped. Moreover, removal of the spots of paraffin or wax does not present any difficulties as they can be removed manually from the surface of the glass by applying slight lateral pressure and without leaving any marks on the surface of the glass.

In packing cases of the above-described type, particular problems are often encountered, such as when the cases are to be sent to hot countries and also when the cases are exposed to powerful mechanical stresses, for example, jolts produced during transportation. In this case the spots must adhere well to the surface of the glass and must possess a high mechanical resistance.

These qualities are not simultaneously optimally satisfied in the case of pure wax or paraffin.

Four examples capable of meeting such major requirements are described below.

EXAMPLE 1

Figure 4:
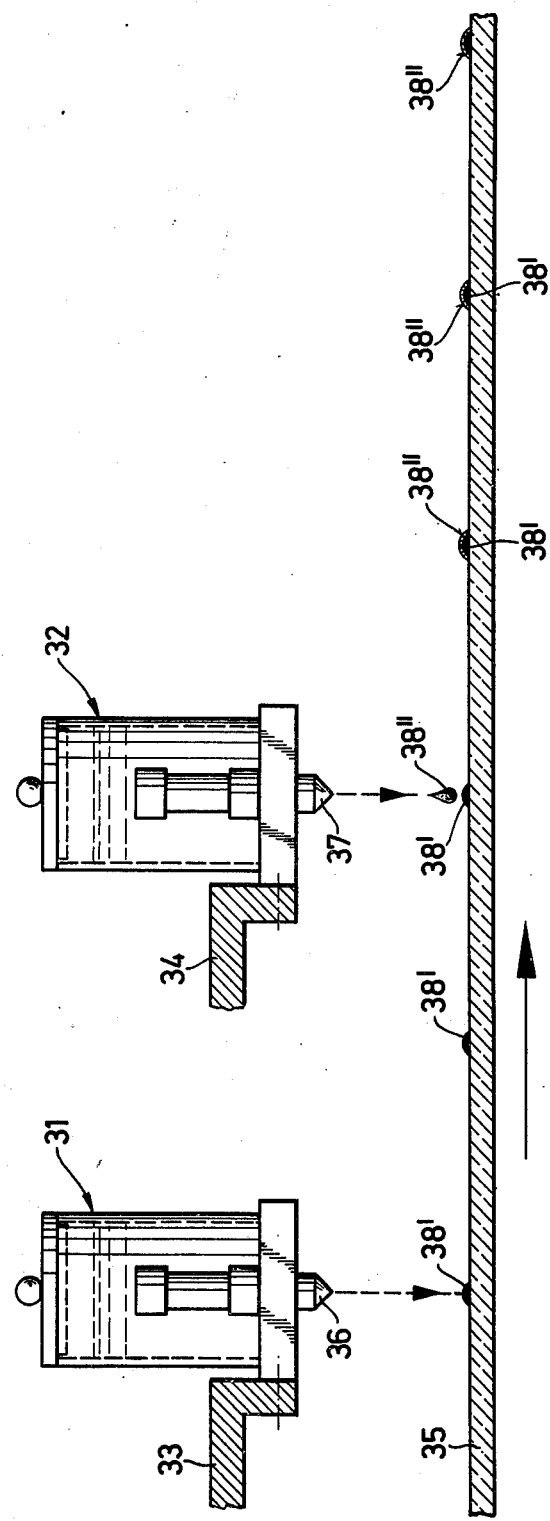
FIG. 4 illustrates means for applying spots consisting of two different wax or paraffin compositions.

Referring to FIG. 4, two different paraffins or waxes are placed one on top of the other on the sheet of glass via the nozzles 36, 37 by means of two separate devices 31, 32, which are attached to the arms 33, 34 of a conveyor for the glass sheet 35. A drop of molten paraffin having a soldification point of approximately 54° C. is deposited by means of the device 31, 36. This drop forms the lower part 38' of the spot. After a short period of time during which the sheet of glass 35 is advanced, at the instant at which the already solidified paraffin spot 38' is located beneath the nozzle 37, a drop of a molten paraffin having a solidification point of approximately 100° C. is deposited by means of a device 32, 37 on the already deposited spot 38'. This latter drop forms the upper layer 38" of the spot. The layer 38" melts the surface of the layer 38' and is durably bonded to the latter. The layer 38' adheres well to the surface of the glass, and the mechanical resistance of the layer 38" is such that the spot as a whole is capable of resisting powerful mechanical stresses. The spots are disposed approximately 30 cm apart from one another which results in approximately 20–30 spots per square meter.

EXAMPLE 2

Approximately 25 spots of a modified molten wax produced and supplied by the firm "VEBA-CHEMIE AG" under the name "VEBAWACHS TH 8434 or TH 8440", are deposited on each square meter of glass surface. These are waxes having a solidification point of 95° or 109° C., to which a product improving adhesion, for example, an atactic polypropylene, is added.

EXAMPLE 3

Approximately 25 spots of a hydrocarbon mixture having a high melting point, which is manufactured and distributed by the firm "SCHLICKUM" of Hamburg, under the name "Paraffin 8384", are deposited on each square meter of the surface of the glass. This material has a solidification point of approximately 100° C. and a penetration index measured by the method of determining needle penetration according to the standard DIN 51 579 of 3 at 20° C. and 35 at 60° C.

EXAMPLE 4

Approximately 25 spots of a modified molten wax containing a certain percentage of a resin and a polymer and which is manufactured and supplied by the company "Papier Und Kunstoffwerke Linnich" of West Germany under the name "SMELTAN 52-952," are deposited on each square meter of glass surface. This material has a solidification point of approximately 105° C. It has the advantage of not adhering or sticking to the surface of the glass which, during stacking, comes in contact with the spot if the temperature is lower than 80° C. Accordingly, there is no mark on the glass.

Figure 5:
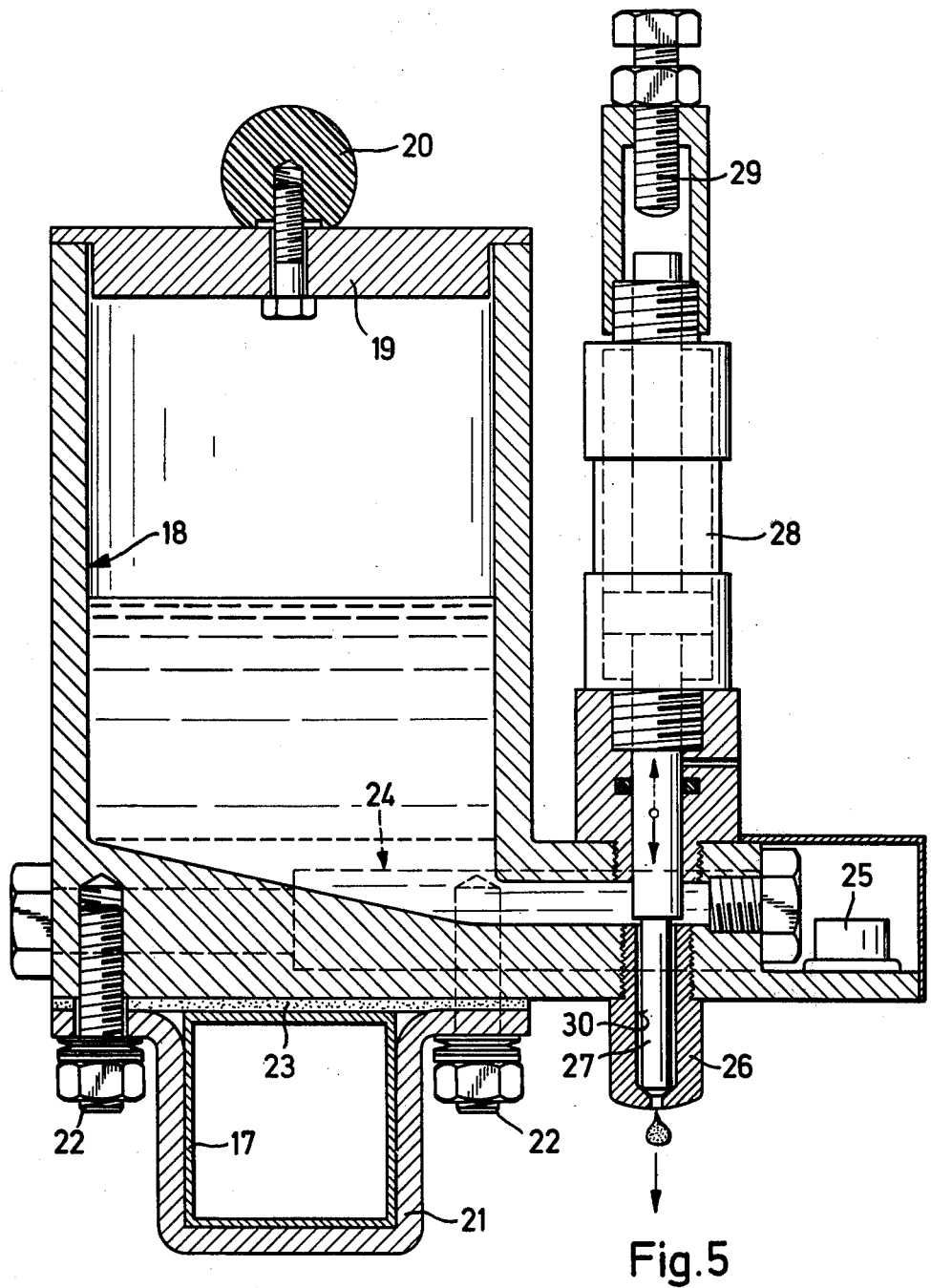
FIG. 5 is a sectional view of the device for depositing drops to form the raised spots.

FIG. 5 is a detailed view of a device which is especially designed for applying spots of paraffin or wax.

This figure shows one device, with as many devices of this type as necessary being mounted at right angles to the horizontal conveyor according to FIG. 1 on a tubular beam having a square section 17 overhanging the conveyor. The device comprises a container 18 which contains the material and which is closed by means of the cover 19 which can be removed by means of the knob 20. The device is attached to the tubular beam having a square section 17 through the intermediary of an asbestos layer 23 and by means of the clamp 21 and the screws 22. A heating cartridge 24 is placed at the base of the container 18 and the thermostat 25 regulates the heating current and maintains at a constant temperature the contents of the container and the nozzle 26 through which the molten wax or paraffin is pushed drop by drop by means of a piston 27 which is displaceable in the bore of the nozzle 30. The piston 27 is operated by means of a pneumatic cylinder 28. The adjusting screw 29 situated above the cylinder 28 is used to determine the length of the stroke of the piston 27, by means of which the size of the drops can be changed.

We claim:

1. A method of stacking or packing sheets of glass which comprises depositing on a surface of a plurality of sheets of glass spaced drops of molten paraffin or wax to form upon solidification spaced raised spots on the surface of the sheet, and stacking said plurality of sheets of glass with said raised spots forming an intercalation between adjacent sheets.

2. A method according to claim 1 in which said drops are applied to form 4–100 raised spots per square meter of the surface of the glass sheet.

3. A method according to claim 2 in which the height of said raised spots is 0.2–2 mm.

4. A method according to claim 1 in which said drops are of paraffin having a melting point in excess of 50° C.

5. A method according to claim 1 in which said drops are of a wax having a solification point in excess of 85° C.

6. A method according to claim 1 in which said molten paraffin or wax has a contractive capacity upon cooling to thereby reduce adhesion to the surface of the glass.

7. A method according to claim 1 in which spaced drops of molten paraffin or wax having a solidification point lower than 60° C. are initially deposited on the surface of the glass sheet to form spaced spots and thereafter drops of molten paraffin or wax having a high melting point and a solidification point in excess of 90° C. are deposited on the initial spaced spots.

8. A method according to claim 1 in which said paraffin or wax has a high melting point and includes a polymer and/or a resin.

9. A method according to claim 1 in which said paraffin or wax includes a mixture of different saturated aliphatic hydrocarbons having different solidification points, the solidification point of the mixture being above 100° C. and the penetration index of the mixture measured by determining needle penetration according to DIN 51 579 being lower than 5 at 20° C. and lower than 40 at 60° C.

* * * * *